April 19, 1932.     B. RALLS     1,854,999
EDUCATIONAL DEVICE
Filed July 21, 1930     2 Sheets-Sheet 2
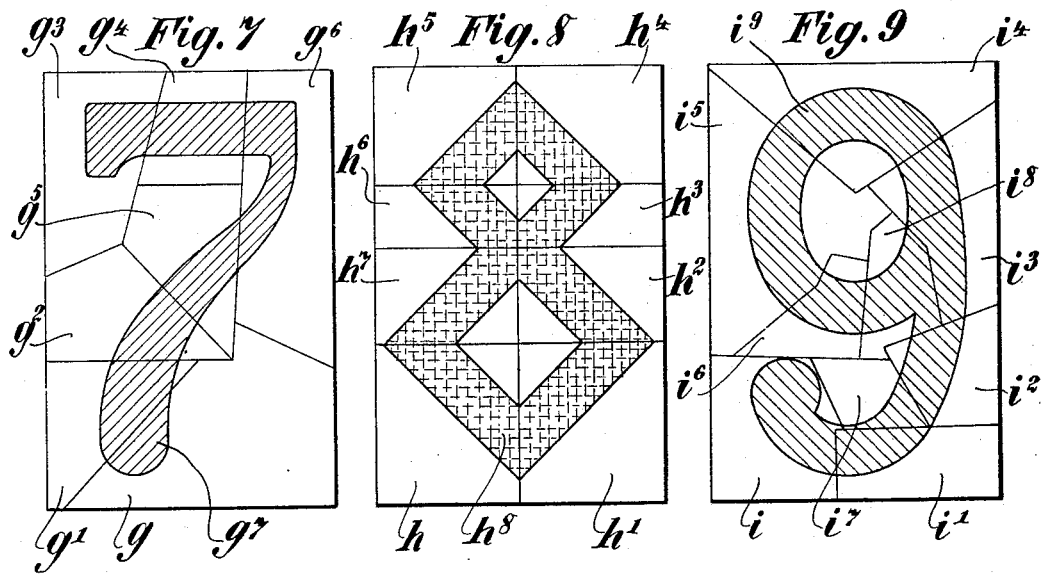
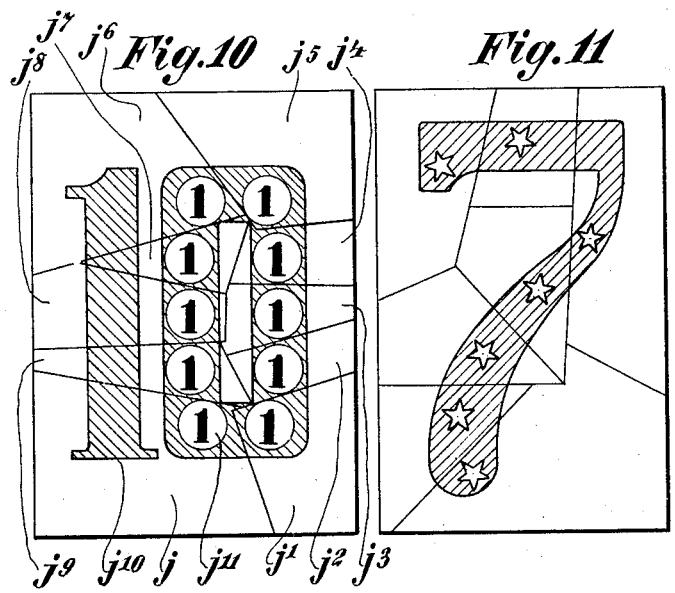
INVENTOR
Blount Ralls,
BY Redding, Greely, O'Shea & Campbell
HIS ATTORNEYS Patented Apr. 19, 1932

1,854,999

UNITED STATES PATENT OFFICE

BLOUNT RALLS, OF BRONXVILLE, NEW YORK

EDUCATIONAL DEVICE

Application filed July 21, 1930. Serial No. 469,597.

The present invention relates to educational devices and embodies, more specifically, a device for instructing a child in the nature and use of numbers. More particularly, the invention embodies an improved device for indicating visually the character and composition of the various numerals, combining with the educational feature the characteristic of a puzzle, whereby the child's interest in the device is sustained over a period of time sufficient to enable it to assimilate certain fundamental principles relating to numbers.

Heretofore there have been provided devices varying in character, in which numbers are used as a basis for a puzzle, etc. While bearing a certain degree of interest for a child, they do not instruct in a logical and systematic way but merely portray numerals in an abstract fashion requiring the child to learn them by rote, if at all. As distinguished from such existing devices, the present invention presents the numerals to a child in a forceful and logical fashion indicating, graphically, the relationship between the various numerals and showing the manner in which their relative values may be compared.

An object of the invention, accordingly, is to provide a device, by means of which the science of numbers may be readily grasped.

A further object of the invention is to provide a device which represents, graphically, the comparative values of the various numbers, additionally incorporating therein an arrangement of elements to form a puzzle.

A further object of the invention is to provide a device of the above character which constitutes a puzzle not only in its entirety but which presents each separate number in puzzle form in order that the attention and interest of a child may be prolonged.

Further objects, not specifically enumerated above, will be apparent as the invention is described in greater detail in connection with the accompanying drawings, wherein:

Figure 7 is a plan view of a similar device bearing the numeral 7, and formed of a corresponding number of segments.

Figure 8 is a plan view of a similar device bearing the numeral 8, and formed of a corresponding number of segments.

Figure 9 is a plan view of a similar device bearing the numeral 9, and formed of a corresponding number of segments.

Figure 10 is a plan view of a similar device bearing the numeral 10 formed of a corresponding number of segments, the digits being so formed as to indicate the relationship thereof to the numeral 1.

Figure 11 is a device similar to Figure 7 but provided with indicia to indicate the relationship of the numeral to a constellation.

Figure 1:
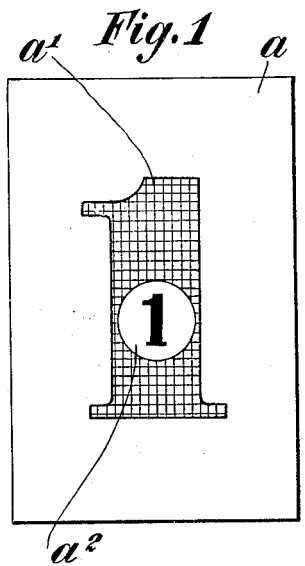
Figure 1 is a plan view of a device bearing the numeral 1 which is preferably portrayed in a distinctive color.

Referring to the above drawings, an indicia bearing device $a$ is shown, in Figure 1, as being formed of a single piece, this device being provided with the numeral 1, as indicated at $a'$. Within the outline of the numeral, the value of a coin or other legend may be inscribed, as indicated at $a^2$, thus enabling the significance of the numeral to be grasped more readily. It is to be noted that this numeral is formed of only one element.

Figure 2:
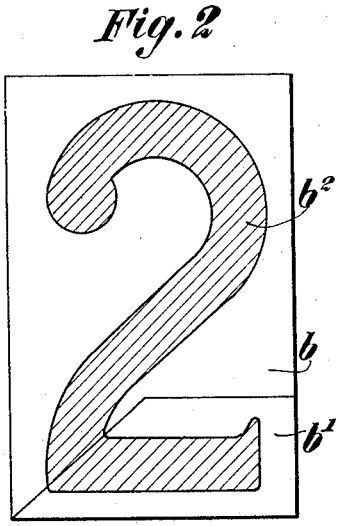
Figure 2 is a plan view of an indicia bearing device composed of two segments and bearing the numeral 2 in a distinctive color.

The numeral 2 is shown in Figure 2 as being formed of two segments $b$ and $b'$. The inscription of the numeral is made to lie partially on each segment and the segments are so formed as to have irregular shape, thus facilitating the assembly thereof. The numeral 2 is shown at $b^2$ as being of a distinctive color, thus further facilitating its assembly.

Figure 3:
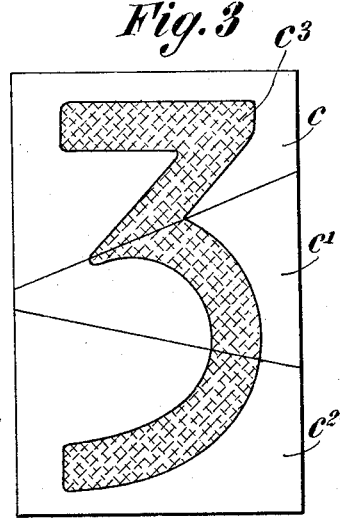
Figure 3 is a plan view of an indicia bearing device upon which the numeral 3 has been inscribed, this device being formed of three segments.

Figure 3 illustrates a similar indicia-bearing device formed of three segments $c$, $c'$, and $c^2$. Upon these segments, the numeral 3 is inscribed, as indicated at $c^3$. As in the case of Figure 2, the numeral 3 is portrayed in a distinctive color to facilitate the assembly of the several segments and to distinguish them from the segments of other numerals.

Figure 4:
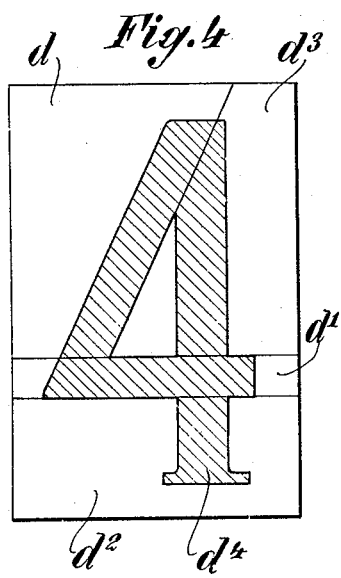
Figure 4 is a similar view of a device bearing the numeral 4, this device being formed of four segments.

Figure 4 shows an indicia-bearing device formed of four segments $d$, $d'$, $d^2$, and $d^3$, the numeral 4 being inscribed partially upon each as indicated at $d^4$. This numeral is also preferably formed of a distinctive color for the reason noted above.

Figure 5:
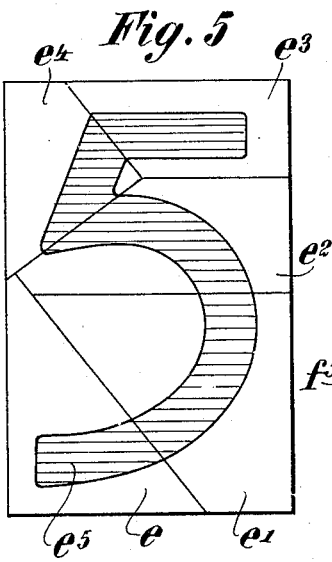
Figure 5 is a plan view of a similar device bearing the numeral 5, the device being formed of a corresponding number of segments.

Figure 5 illustrates an indicia-bearing device formed of five segments $e$, $e'$, $e^2$, $e^3$, and $e^4$, the numeral 5 being incribed partially upon each as shown at $e^5$. This numeral is also preferably formed of a distinctive color for the reason noted above.

Figure 6:
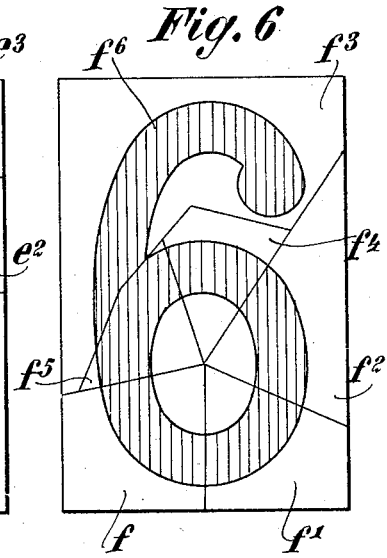
Figure 6 is a plan view of a similar device bearing the numeral 6 and formed of a corresponding number of segments.

Figure 6 illustrates a similar device formed of six segments $f$, $f'$, $f^2$, $f^3$, $f^4$, and $f^5$, the numeral 6 being inscribed partially upon each as shown at $f^6$. This numeral is also preferably formed of a distinctive color for the reason noted above.

Figure 7 illustrates a similar indicia-bearing device formed of seven segments $g$, $g'$, $g^2$, $g^3$, $g^4$, $g^5$ and $g^6$, the numeral 7 being inscribed partially upon each and formed of a distinctive color, as indicated at $g^7$. This numeral is also preferably formed of a distinctive color for the reason noted above.

Figure 8 shows a similar device formed of eight segments $h$, $h'$, $h^2$, $h^3$, $h^4$, $h^5$, $h^6$, and $h^7$, the numeral 8 being inscribed partially upon each and formed of a distinctive color, as indicated at $h^8$. This numeral is also preferably formed of a distinctive color for the reason noted above.

Figure 9 shows a similar device formed of nine segments $i$, $i'$, $i^2$, $i^3$, $i^4$, $i^5$, $i^6$, $i^7$, and $i^8$, the numeral 9 being inscribed partially upon each of these segments, as indicated at $i^9$. This numeral is also preferably formed of a distinctive color for the reason noted above.

Figure 10 illustrates a similar device formed of ten segments $j$, $j'$, $j^2$, $j^3$, $j^4$, $j^5$, $j^6$, $j^7$, $j^8$, and $j^9$, the numeral 10 being inscribed partially upon each. In forming the numeral 10 on these segments, the digit 1 is shown at $j^{10}$ and the zero at $j^{11}$. It is preferred that the zero have indicated within the outline thereof, the number of units which the numeral 10 represents. The zero preferably is shown as including ten such coins.

Figure 11 shows a modified form of indicia-bearing device upon which the numeral 7 has been inscribed, the segments thereof being similar to those shown in Figure 7 and the numeral 7 including within the outline thereof a constellation, such as a big dipper which has a number of stars equal to the number of segments of the numeral 7. In this manner, certain of the constellations may be taught the child in addition to utilizing them as a basis for instructing in the science of numbers.

Figure 12 is a view similar to Figure 9, showing the 9 as including within its outline a baseball diamond with the players arranged in their proper positions. This indicates the manner in which games or other subjects may be taught in connection with the science of numbers.

While the invention has been described with specific reference to the accompanying drawings, it is not to be limited, save as defined in the appended claim.

I claim as my invention:

Numerical indicia carrying means, and a single numeral greater than unity inscribed thereon, said means being formed of as many segments as the inscribed numeral represents units, and a portion of said numeral being inscribed upon each segment.

This specification signed this 18th day of July, A. D. 1930.

BLOUNT RALLS.